(12) United States Patent
Lee et al.

(10) Patent No.: US 8,365,209 B2
(45) Date of Patent: Jan. 29, 2013

(54) OPTICAL DISC DRIVE

(75) Inventors: Jaesung Lee, Seoul (KR); Moonho Choi, Seoul (KR); Seunghon Yoo, Seoul (KR); Yoonchul Rhim, Seoul (KR); Hyeonggi Kim, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 120 days.

(21) Appl. No.: 13/071,026

(22) Filed: Mar. 24, 2011

(65) Prior Publication Data

US 2011/0239237 A1 Sep. 29, 2011

(30) Foreign Application Priority Data

Mar. 25, 2010 (KR) .................. 10-2010-0026569

(51) Int. Cl.
*G11B 33/14* (2006.01)
(52) U.S. Cl. ............................................. 720/648
(58) Field of Classification Search .......... 720/648; 360/97.01
See application file for complete search history.

(56) References Cited

U.S. PATENT DOCUMENTS

| 7,630,166 | B2 * | 12/2009 | Rahman | 360/97.14 |
| 7,701,700 | B2 * | 4/2010 | Hall et al. | 361/679.33 |
| 2010/0046114 | A1 * | 2/2010 | Rahman | 360/97.03 |

* cited by examiner

*Primary Examiner* — Angel A. Castro
(74) *Attorney, Agent, or Firm* — Birch, Stewart, Kolasch & Birch, LLP

(57) ABSTRACT

An optical disc drive is disclosed. The optical disc drive comprises a housing including an upper housing and a lower housing; and a herringbone pattern that is protruded toward the inner space of the housing on the inner surface of the upper housing and causes an air flow generated by the rotation of an optical disc to be switched to the direction of the optical disc. The herringbone pattern comprises at least one inflection point, and makes an acute angle at the inflection point relative to the direction of the air flow formed along the inner surface of the upper housing. Accordingly, the optical disc can be stably chucked and rotated by switching the air flow generated by the rotation of the optical disc to the direction of the optical disc.

7 Claims, 4 Drawing Sheets
(1 of 4 Drawing Sheet(s) Filed in Color)

OPTICAL DISC DRIVE

This nonprovisional application claims priority under 35 U.S.C. §119(a) on Patent Application No. 10-2010-0026569 filed in Republic of Korea on Mar. 25, 2010 the entire contents of which are hereby incorporated by reference.

BACKGROUND

1. Field

This document relates to an optical disc drive, and more particularly, to an optical disc drive which enables an optical disc to be stably chucked and rotated by switching the air flow generated by the rotation of the optical disc to the direction of the optical disc.

2. Related Art

In general, an optical disc drive (ODD) refers to a device that uses a laser to write data or read data on optical discs of various types such as CD, DVD, and BD.

An optical disc is advantageous in that it is handy to carry around despite its large capacity. Moreover, while optical discs were writable only once in the past, optical discs capable of repetitively rewriting have been used in recent years and there is an increasing trend towards convenience.

Optical disc drives for writing or reading data on an optical disc include a tray type optical disc drive which loads or unloads an optical disc by placing the optical disc on a tray and a slot-in type optical disc drive which allows an optical disc to be automatically inserted into the optical disc drive by a driving motor by inserting the optical disc into a front opening.

The slot-in type optical disc drive loads or unloads an optical disc by a plurality of rollers making contact with a side face of the optical disc and guiding the movement of the optical disc. As a tray and equipment and devices for driving the tray are omitted, the slot-in type optical disc drive can be designed to be slim compared to the tray type optical disc drive, and have a more sophisticated appearance compared to the tray type optical disc drive. For this reason, the slot-in type optical disc drive is used for vehicles due to spatial restrictions.

SUMMARY

An aspect of this document is to provide an optical disc which enables an optical disc to be stably chucked and rotated by switching the air flow generated by the rotation of the optical disc to the direction of the optical disc.

In an aspect, an optical disc drive comprises: a housing including an upper housing and a lower housing; and a herringbone pattern that is protruded toward the inner space of the housing on the inner surface of the upper housing and causes an air flow generated by the rotation of an optical disc to be switched to the direction of the optical disc.

In an embodiment, the herringbone pattern comprises at least one inflection point, and makes an acute angle at the inflection point relative to the direction of the air flow formed along the inner surface of the upper housing.

In an embodiment, the herringbone pattern is made up of a plurality of chevrons being spaced apart from each other along a virtual circle centered on the center point of the upper housing.

In an embodiment, the herringbone pattern is defined by a looped curve which is formed by a plurality of spiral curves and a surface includes the looped curve protruding toward the inner space.

In an embodiment, the herringbone pattern is formed by a pressing method for pressing the outer surface of the upper housing toward the inner surface.

In another aspect, an optical disc drive comprises: a housing; and a herringbone pattern that is protruded toward the inner space of the housing on the inner surface of the housing and has a holding portion concave toward the direction of an air flow formed within the housing.

The herringbone pattern is made up of a plurality of chevrons being spaced apart from each other along a virtual circle centered on the center point of the housing.

An optical disc according to the present invention enables an optical disc to be stably chucked and rotated by switching the air flow generated by the rotation of the optical disc to the direction of the optical disc.

BRIEF DESCRIPTION OF THE DRAWINGS

The patent or application file contains at least one drawing executed in color. Copies of this patent or patent application publication with color drawing(s) will be provided by the office upon request and payment of the necessary fee.

DETAILED DESCRIPTION

Figure 1:
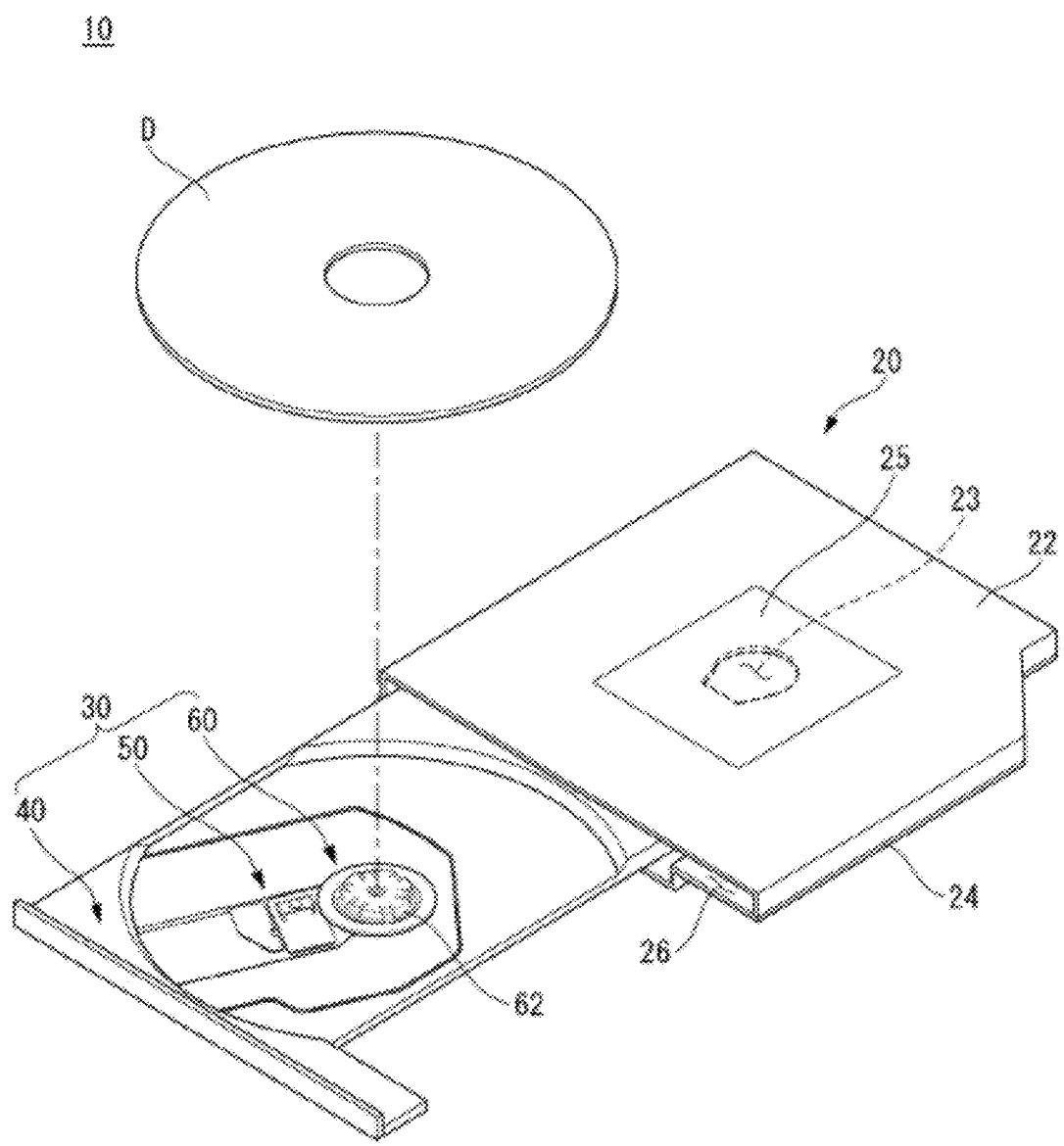
FIG. 1 is a perspective view of an optical disc drive according to an exemplary embodiment of the present invention.

The above objects, characteristics, and merits of this document will become more apparent from the following detailed description taken in conjunction with the accompanying drawings. This document can be modified in various ways and can have several embodiments. Hereinafter, some of the embodiments are shown in the accompanying drawings and described in detail with reference to the drawings. The same reference numerals, as a general rule, designate the same elements throughout the specification. Further, a detailed description of the known functions or constructions will be omitted if it is deemed to make the gist of this document unnecessarily vague. It is also to be noted that numbers (e.g., first and second) used in the description of this document are only identification symbols for distinguishing one element from the other element. The above and other objects, features and advantages of the present invention will become apparent from the following detailed description taken with the accompanying drawings. As the invention allows for various changes and numerous embodiments, particular embodiments will be illustrated in the drawings and described in detail in the written description. Like reference numerals designate like elements throughout the specification. In the following description, detailed descriptions of well-known functions or constructions will be omitted since they would obscure the invention in unnecessary detail.

FIG. 1 is a perspective view of an optical disc drive according to an exemplary embodiment of the present invention.

As shown therein, an optical disc drive 10 according to an exemplary embodiment of the present invention may comprise a housing 20 and a tray assembly 30 to be pulled in and out to the front of the housing 20.

The housing 20 forms the exterior of the optical disc drive 10. The housing 20 forming the exterior protects the internal components from external shock. The optical disc drive 10 according to an exemplary embodiment of the present invention may be a slim type in which the height of the housing 20 is smaller than that of a typical optical disc drive. The housing 20 may be formed in such a manner that an upper housing 20 and a lower housing 24 are assembled.

The upper housing 22 and the lower housing 24 may be formed by pressing a steel plate or by injection-molding of plastic. A through hole 23 may be provided at the center of the upper housing 22. The through hole 23 may be positioned at the upper end of a clamp head 62 when the optical disc drive 10 holding an optical disc D is in operation. Because the clamp head 62 may be positioned at a higher location than those of other parts within the housing 20, the clamp head 62 may come into contact with the inner surface of the upper housing 22. To prevent this in advance, the through hole 23 may be formed at the center part of the upper housing 22. A label 25 may be attached to the through hole 23. A herringbone pattern (P of FIG. 2) according to an exemplary embodiment of the present invention may be provided on the inner surface of the upper housing 22. This will be described more specifically in the corresponding part. An optical disc insertion slot 26 for inserting or removing the tray assembly 30 holding the optical disc D may be provided on the front side of the housing 20.

The tray assembly 30 may be a combination of a tray 40, an optical pickup unit 50, and a spindle motor unit 60. In the optical disc drive 10 according to an exemplary embodiment of the present invention, the optical pickup unit 50 and the spindle motor unit 60 may be coupled to the tray 40 to operate integrally with the tray 40. That is, this means that, the moment the tray 40 is taken out, the optical pickup unit 50 and the spindle motor unit 60 may also be taken out. However, it should be noted that the present invention is not only applicable to the optical disc drive 10 having the tray assembly 30 of this configuration. For instance, the present invention is also, of course, applicable to a case where only the tray 40 is taken out and the optical pickup unit 50 and the spindle motor unit 60 are moved only within the housing 20.

The tray 40 is a portion that holds the optical disc D. The tray 40 holding the optical disc D can be taken in and out of the housing 20 via the optical disc insertion slot 26. The tray 40 may be formed by plastic injection molding.

The optical pickup unit 50 is movable along a guide shaft (not shown) in the radius direction of the optical disc D. The optical pickup unit 50 moves in the radius direction of the optical disc D, and can write data or read written data by radiating a laser beam to the rotating optical disc D.

The spindle motor unit 60 may comprise a clamp head 62 that rotates by a driving force generated and transmitted from a spindle motor (not shown). The clamp head 62 can rotate at high speed while holding the optical disc D. When the clamp head 62 rotates at high speed within the housing 20, which is a rather narrow space, an air flow is generated by rotation of the optical disc D. The air flow can reduce the pressure in a particular portion and increase the pressure in another particular portion. At this point, if the pneumatic pressure of the top surface of the optical disc D is reduced, this can make the chucking of the optical disc D unstable. If the chucking is unstable, the optical disc D may be moved. That is, this means that the optical disc D plane may not be kept flat and vibrate up and down and left and right. When the optical disc D plane vibrates, an error may occur during data access via the optical pickup unit 50. That is, this means that the optical pickup unit 50 may fail to follow a specific track on the optical disc D. The optical disc drive 10 according to an exemplary embodiment of the present invention may have a regular pattern formed on the inner surface of the upper housing 22 in order to increase the pneumatic pressure of the top surface of the optical disc.

Figure 2:
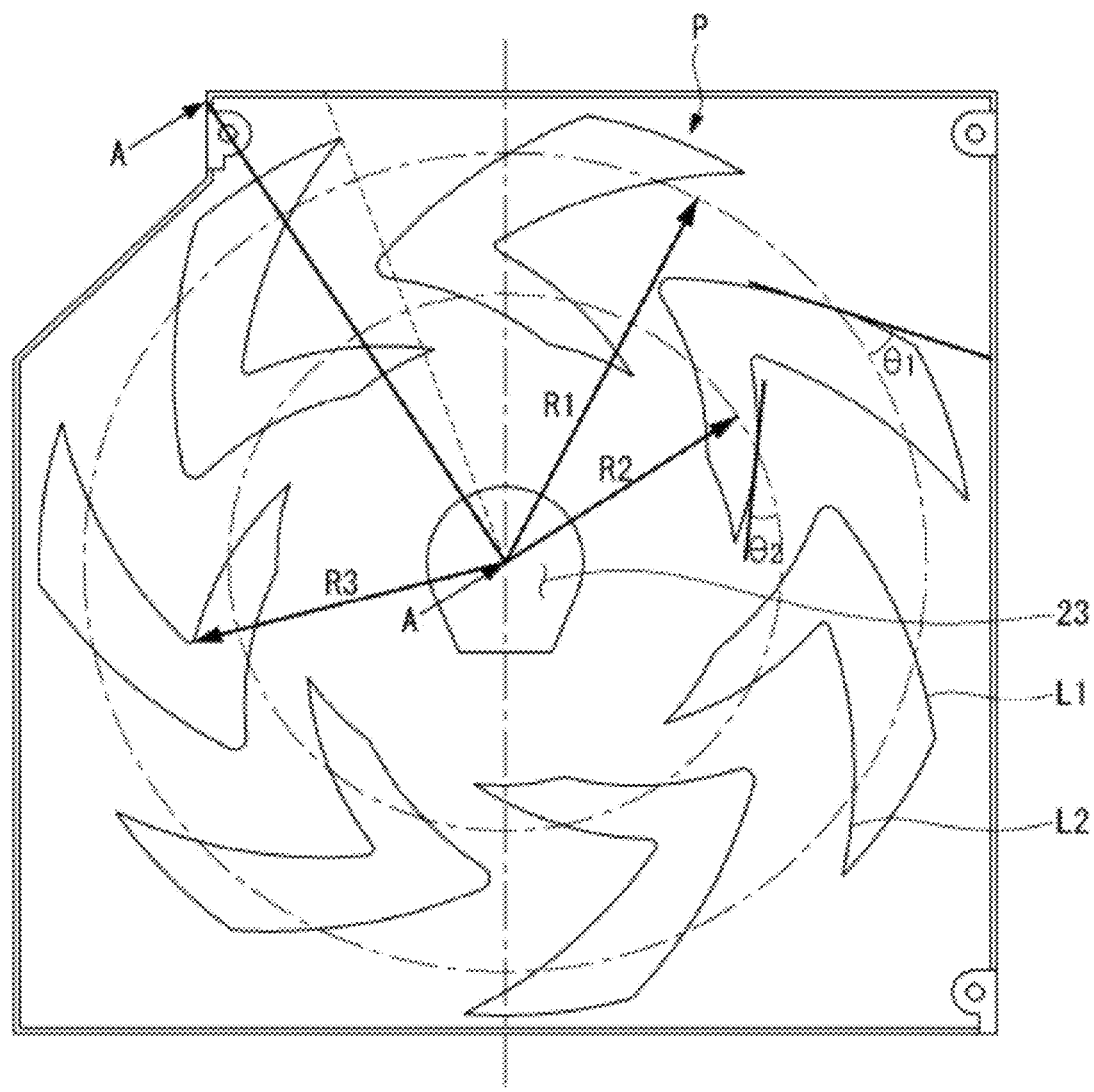
FIG. 2 is a view showing the inner surface of the upper housing of the optical disc drive of FIG. 1.

FIG. 2 is a view showing the inner surface of the upper housing of the optical disc drive of FIG. 1.

As shown therein, a herringbone pattern P may be formed on the inner surface of the upper housing 22 according to an exemplary embodiment of the present invention.

The herringbone pattern P refers to a pattern made up of a shape similar to '<' repeated over and over. As discussed earlier, when the optical disc (D of FIG. 1) rotates at high speed, a pneumatic pressure difference is generated due to the rotating optical disc (D of FIG. 1). The pneumatic pressure difference may cause the rotating optical disc (D of FIG. 1) to vibrate in the up-and-down direction. For example, a negative pressure may be generated to cause the optical disc (D of FIG. 1) to be lifted upward from the normal rotation plane. The herringbone pattern P can suppress generation of such a negative pressure. Further, the herringbone pattern P formed on the upper housing 22 can be expected to improve the rigidity of the upper housing 22 compared to forming no pattern at all.

The herringbone pattern P may be formed toward the inner space of the housing 20. To form the herringbone pattern P in the direction of the inner space of the housing 20, a pressing method can be used to compress the upper housing 22. The herringbone pattern P may be formed to make an acute angle relative to the direction of an air flow formed by the optical disc (D of FIG. 1). That is, a holding portion concave toward the direction of the air flow is protruded to disturb the air flow so that the pressure of the corresponding portion increases. The herringbone pattern P may be defined by a looped curve, which is formed by connecting a first line L1 and a second line L2 which are spiral curves.

The first line L1 denotes a line forming the outer side of the herringbone pattern P. Each chevron of the herringbone pattern P can make a first angle $\theta 1$ relative to a tangent of a first virtual circle R1 centered on the center point of the upper housing 22. The first line L1 may form an inflection point on a third virtual circle R3. That is, this means that the angle of the first line L1 abruptly changes on the third virtual circle R3. The optical disc (D of FIG. 1) rotates clockwise. Accordingly, it can be assumed that the optical disc (D of FIG. 1) rotates counterclockwise with respect to the center of the lower side of the upper housing 22 shown in FIG. 2, and the air flow formed by the optical disc D can be formed counterclockwise because of the counterclockwise rotation of the optical disc (D of FIG. 1). The air flowing counterclockwise is interfered by the herringbone pattern P near the inflection point. Since the air flow is restricted near the inflection point, the pneumatic pressure of that portion increases. Therefore, a descending air current may be generated near the inflection point where the pneumatic pressure is increased, and flow in the direction of a plane of the optical disc (D of FIG. 1). The descending air current can act as a pressure pushing the optical disc (D of FIG. 1), and reduce vibration and noise which may be generated by the optical disc (D of FIG. 1) rotating at high speed.

The second line L2 denotes a line forming the inner side of the herringbone pattern P. Each chevron of the herringbone pattern P can make a second angle $\theta 2$ relative to a tangent of a second virtual circle R2 centered on the center point of the upper housing 22. The second line L2 as well may form an inflection point on the third virtual circle R3 and its angle abruptly changes thereon.

Figure 3:
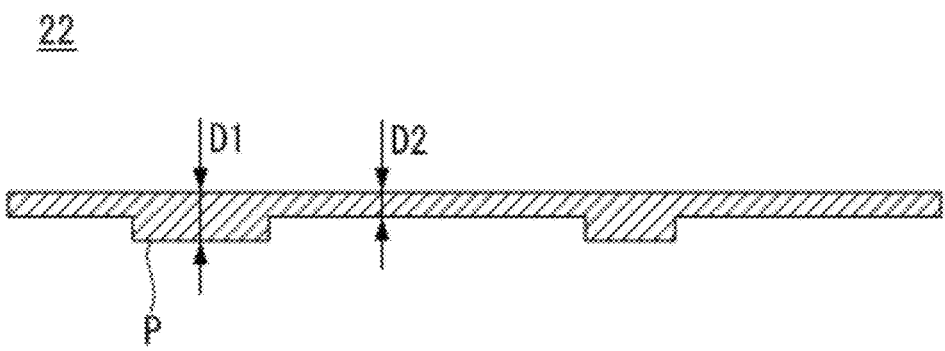
FIG. 3 is a sectional view of A-A direction of the upper housing of FIG. 2.

FIG. 3 is a sectional view of A-A direction of the upper housing of FIG. 2.

As shown therein, the herringbone pattern P may be formed with a first thickness D1 with respect to the top surface of the upper housing 22. The first thickness D1 may be greater than a second thickness D2 which is the original thickness. As the herringbone pattern P is formed with the first thickness D1, the air flowing along the surface of the upper housing 22 may be interfered by the herringbone pattern P and switched to an air flow moving downward.

Figure 4:
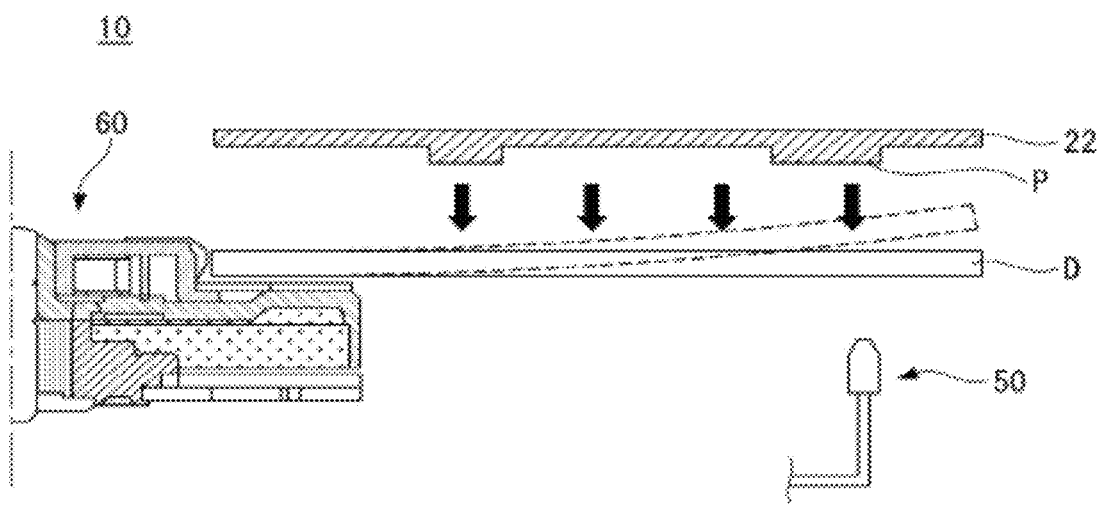
FIG. 4 is a view schematically showing the operation of the optical disc drive of FIG. 1.

FIG. 4 is a view schematically showing the operation of the optical disc drive of FIG. 1.

As shown therein, the optical disc drive 10 according to an exemplary embodiment of the present enables the optical disc D vibrating upward in a modified manner to rotate stably on the rotation plane before modification.

The optical disc D rotating in conjunction with the spindle motor unit 60 rotates at high speed, and may creates noise when vibrating. The vibration and noise of the optical disc D may become serious if the optical disc D is not stably coupled to the spindle motor unit 60. The optical disc drive 100 according to an exemplary embodiment of the present invention allows the optical disc D to be stably fastened to the spindle motor unit 60 by generating a descending air current which presses the optical disc D downward.

The optical disc D rotates clockwise. The optical disc D rotating clockwise generates a clockwise air flow. If the clockwise air flow is interfered by the herringbone pattern P, it can be switched to be directed downward. The air flow switched to be directed downward can act as a force for pressing the optical disc D downward. Accordingly, this can lead to the effect of causing the optical disc D to be stably coupled to the spindle motor unit 60. Thus, the rotation of the optical disc D becomes stable, and therefore the optical pickup unit 50 is able to stably follow a track on the optical disc D. Moreover, it is expected that the noise and vibration of the optical disc D can be reduced. According to an experiment, a noise reduction of about 13% is observed.

Figure 5:
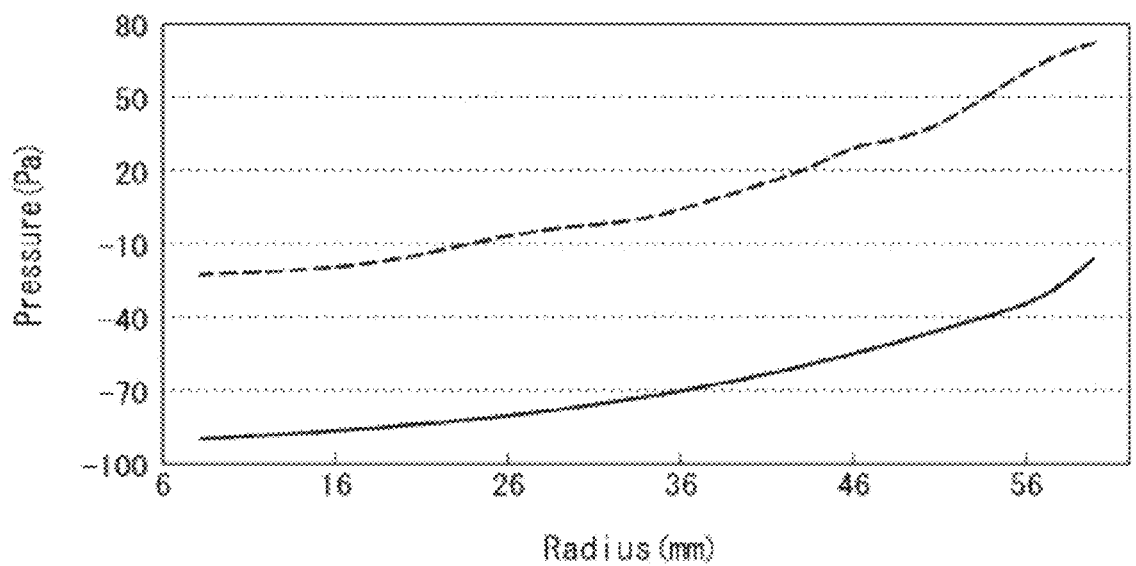
FIGS. 5 and 6 are views showing the performance of the optical disc drive of FIG. 1.
Figure 6:
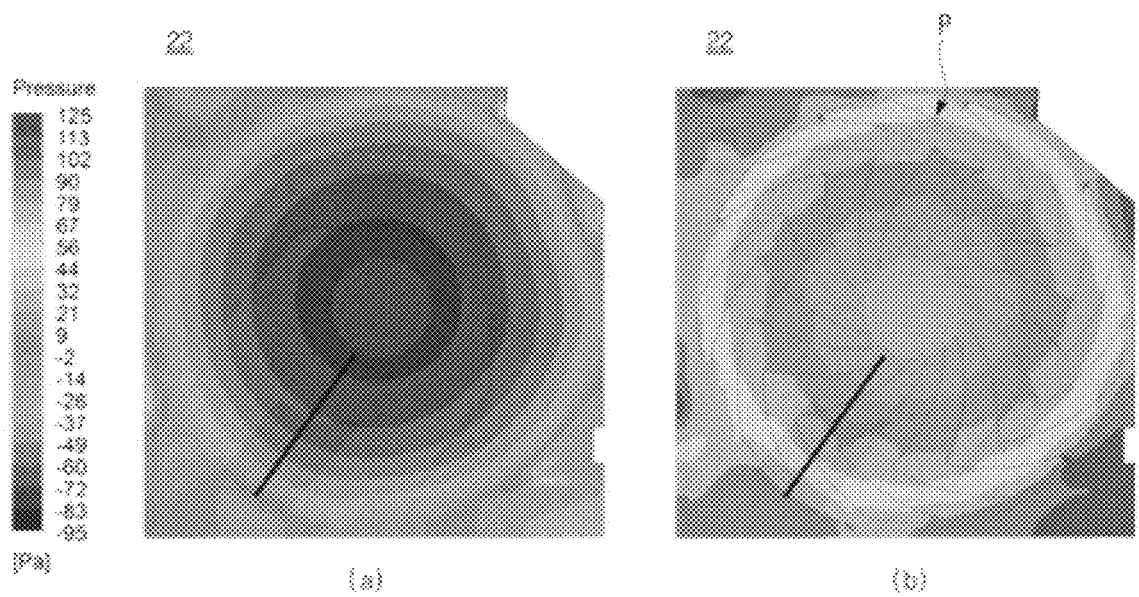

FIGS. 5 and 6 are views showing the performance of the optical disc drive of FIG. 1.

As shown in these drawings, the optical disc drive 10 according to an exemplary embodiment of the present invention can be expected to change the flow of air within the housing 20.

As shown in FIG. 5, it can be seen that a first experimental graph (dotted line) to which the herringbone pattern is applied shows a higher pressure in a particular position in the radius direction of the optical disc D as compared to a second experimental graph (real line) to which the herringbone pattern is not applied. For example, it is observed that, while the pressure at the 36 mm radius point is about 5 Pa if the herringbone pattern is applied, the pressure at the 36 mm radius point is about −70 Pa if the herringbone pattern is not applied. This experimental result supports the fact that, if the herringbone pattern is applied, a descending air current may be generated at the 36 mm radius point; otherwise an ascending air current may be generated at the 36 mm radius point.

As shown in FIG. 6, it can be seen that the pressure of the upper housing 22 is high when the herringbone pattern is applied. This will be explained in more detail as follows. As the pressure distribution color is close to blue, the pressure at that point is low; whereas as the pressure distribution color is close to red, the pressure at that point is high. Thus, it can be assumed that, as shown in FIG. 6(a), if no herringbone pattern exits, a negative pressure distribution is shown where the overall pressure is low. On the contrary, it can be assumed that, as shown in FIG. 6(b), if the herringbone pattern exists, a positive pressure distribution is shown where the overall pressure is high. Therefore, it can be expected that a descending air current directed downward will be generated in the upper housing 22. Hence, the descending air current presses the optical disc (D of FIG. 4) downward. As a result, the optical disc (D of FIG. 4) is able to rotate stably at the normal position, with its vibration and noise being reduced.

While we have shown and described several embodiments in accordance with the present invention, it is understood that the same is not limited thereto but is susceptible of numerous changes and modifications as known to those skilled in the art, and we therefore do not wish to be limited to the details shown and described herein but intended to cover all such changes and modifications as are encompassed by the scope of the appended claims.

What is claimed is:

1. An optical disc drive comprising:
   a housing including an upper housing and a lower housing; and
   a herringbone pattern that is protruded toward inner space of the housing on an inner surface of the upper housing and causes an air flow generated by rotation of an optical disc to be switched to a direction of the optical disc.

2. The optical disc drive of claim 1, wherein the herringbone pattern comprises at least one inflection point, and makes an acute angle at the inflection point relative to a direction of the air flow formed along the inner surface of the upper housing.

3. The optical disc drive of claim 1, wherein the herringbone pattern is made up of a plurality of chevrons being spaced apart from each other along a virtual circle centered on a center point of the upper housing.

4. The optical disc drive of claim 1, wherein the herringbone pattern is defined by a looped curve which is formed by a plurality of spiral curves, a surface including the looped curve protruding toward the inner space.

5. The optical disc drive of claim 1, wherein the herringbone pattern is formed by a pressing method for pressing an outer surface of the upper housing toward the inner surface.

6. An optical disc drive comprising:
   a housing; and
   a herringbone pattern that is protruded toward inner space of the housing on an inner surface of the housing and has a holding portion concave toward a direction of an air flow formed within the housing.

7. The optical disc drive of claim 6, wherein the herringbone pattern is made up of a plurality of chevrons being spaced apart from each other along a virtual circle centered on a center point of the housing.

* * * * *